US012720260B2

(12) United States Patent
Li et al.

(10) Patent No.: US 12,720,260 B2
(45) Date of Patent: Aug. 25, 2026

(54) REMOVEABLE SPEAKER FOR COMPUTING DEVICES

(71) Applicant: Dolby Laboratories Licensing Corporation, San Francisco, CA (US)

(72) Inventors: Zhi Li, Shenzhen (CN); Pengfeng Zhang, Shanghai (CN); Nengkun Lv, Shenzhen (CN); Yili Lu, Shenzhen (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 128 days.

(21) Appl. No.: 18/550,175

(22) PCT Filed: May 26, 2022

(86) PCT No.: PCT/US2022/030979

§ 371 (c)(1),
(2) Date: Sep. 12, 2023

(87) PCT Pub. No.: WO2022/251401

PCT Pub. Date: Dec. 1, 2022

(65) Prior Publication Data

US 2024/0163608 A1 May 16, 2024

Related U.S. Application Data

(60) Provisional application No. 63/305,416, filed on Feb. 1, 2022, provisional application No. 63/216,588, filed on Jun. 30, 2021.

(30) Foreign Application Priority Data

May 27, 2021 (WO) ................ PCT/CN2021/096465

(51) Int. Cl.
*H04R 3/14* (2006.01)
*H04R 1/10* (2026.01)
(Continued)

(52) U.S. Cl.
CPC ............. *H04R 3/14* (2013.01); *H04R 1/1025* (2013.01); *H04R 3/04* (2013.01); *H04R 2420/03* (2013.01);
(Continued)

(58) Field of Classification Search
CPC .......... H04R 3/14; H04R 1/1025; H04R 3/04; H04R 2420/03; H04R 2420/07; H04R 2499/11; H04R 2499/15; H04R 2420/05
See application file for complete search history.

(56) References Cited

U.S. PATENT DOCUMENTS 5,852,545 A * 12/1998 Pan-Ratzlaff .......... H04R 1/025 381/300
6,104,819 A 8/2000 Nickum
(Continued)

FOREIGN PATENT DOCUMENTS

CN 1611094 A 4/2005
CN 101155436 A 4/2008
(Continued)

*Primary Examiner* — Oyesola C Ojo

(57) ABSTRACT

A computing device system including a computing device having a housing and electronic components disposed within the housing, where the electronic components include a controller, a memory, and a power source. A display screen is supported on the housing, and a socket extends into the housing. A removable speaker is selectively received within the socket, where the removable speaker includes a power source that is automatically charged when received within the socket.

20 Claims, 5 Drawing Sheets

(51) Int. Cl.
*H04R 1/1025* (2026.01)
*H04R 3/04* (2006.01)

(52) U.S. Cl.
CPC ...... *H04R 2420/07* (2013.01); *H04R 2499/11* (2013.01); *H04R 2499/15* (2013.01)

(56) References Cited

U.S. PATENT DOCUMENTS

| | | | | |
|---|---|---|---|---|
| 6,191,942 | B1 * | 2/2001 | Lee | G06F 1/1616 345/905 |
| 2004/0196985 | A1 * | 10/2004 | Kokubo | H04R 5/04 381/79 |
| 2007/0012166 | A1 * | 1/2007 | Vinson | H04R 1/02 84/723 |
| 2008/0032664 | A1 | 2/2008 | Chou | |
| 2008/0080730 | A1 * | 4/2008 | Takakusaki | H04R 5/02 381/28 |
| 2012/0225699 | A1 | 9/2012 | Griffin | |
| 2013/0244734 | A1 * | 9/2013 | Latham | H04M 1/0258 455/569.1 |
| 2013/0267275 | A1 * | 10/2013 | Onishi | H04M 1/03 455/556.1 |
| 2014/0226848 | A1 * | 8/2014 | Lin | H04R 1/025 381/387 |
| 2015/0271615 | A1 * | 9/2015 | Kano | H04R 29/001 381/59 |
| 2017/0105069 | A1 * | 4/2017 | Mezzomo | H04R 1/026 |
| 2017/0295272 | A1 * | 10/2017 | Gan | H04M 1/725 |
| 2019/0261084 | A1 * | 8/2019 | Ozcan | H04R 3/04 |
| 2020/0238872 | A1 * | 7/2020 | Switalski | H04R 1/028 |
| 2020/0288001 | A1 | 9/2020 | Kumar | |
| 2021/0237659 | A1 * | 8/2021 | Ludwig | B60R 16/033 |
| 2024/0163608 | A1 * | 5/2024 | Li | H04R 1/1025 |

FOREIGN PATENT DOCUMENTS

| | | | |
|---|---|---|---|
| CN | 204557288 | U | 8/2015 |
| CN | 111095945 | A | 5/2020 |
| KR | 20060100110 | A | 9/2006 |

* cited by examiner

REMOVEABLE SPEAKER FOR COMPUTING DEVICES

CROSS-REFERENCE TO RELATED APPLICATIONS

This application is a U.S. National Stage application under U.S.C. 371 of International Application No. PCT/US2022/030979, filed on May 26, 2022, which claims priority to U.S. Provisional Application No. 63/305,416, filed Feb. 1, 2022, U.S. Provisional Application No. 63/216,588, filed Jun. 30, 2021, and PCT/CN2021/096465 filed May 27, 2021, all of which are incorporated herein by reference in their entirety.

FIELD OF INVENTION

Embodiments described herein relate to sounds systems that include speakers and headphone-type devices. More specifically, embodiments described herein provide systems and methods regarding removable speakers for use as headphones with a computing device.

BACKGROUND

Wireless earbuds and headphones that pair with computing devices such as laptops, mobile phones and tablets have become a popular choice for users to listen to audio while working with the computing device. However, current wireless earbuds and headphones can suffer from various disadvantages, including untimely loss of battery power and easily being misplaced due to their size. Also, standard laptops, mobile phones and tablets often lack a sound system with a wide dynamic range and can be deficient at, for example, higher frequencies.

SUMMARY

The present disclosure provides a computing device system including a computing device having housing and electronic components disposed within the housing, where the electronic components include a controller, a memory, and a power source. A display screen is supported on the housing, and a socket extends into the housing. A removable speaker is selectively received within the socket, where the removable speaker includes a power source that is automatically charged when received within the socket.

The present disclosure provides a computing device system including a computing device having housing and electronic components disposed within the housing, where the electronic components include a controller, a memory, and a power source. A display screen is supported on the housing, and a socket extends into the housing. A removable speaker is selectively received within the socket, where the removable speaker is configured to operate as a tweeter when received within the socket and is configured to operate as full range speaker when removed from the socket.

The present disclosure provides a computing device system including a housing having a display screen, a first socket, and a second socket. Electronic components are disposed within the housing, where the electronic components include a controller, a memory, and a power source. A first removable speaker selectively is received within the first socket, and a second removable speaker is selectively received within the second socket, wherein the first speaker and the second speaker are operable as wireless earbuds when removed from the respective first socket and second socket.

Other aspects will become apparent by consideration of the detailed description and accompanying drawings.

DETAILED DESCRIPTION

As described herein, a removable speaker can be selectively plugged into a mobile computing device such as a laptop computer, a tablet computer, a smart phone, or a smart watch. This allows the removable speaker to be "hidden" in the computing device and/or charged when not in use. Additionally, when a user of the computing device listens to audio, such as music or movies, on the computing device, the removable speaker may be plugged into the computing device and used as a general speaker (e.g., an open or an onboard speaker), which outputs sound to a room or a space. Alternatively, the speaker may be removed from the computing device and used as a wireless earbud (e.g., a closed or personal speaker), which outputs sound directly to a person's ear. For example, when a user wants to have private conference call or even listen to the music or a video in a public place without others hearing, the user may prefer earbuds or headphone. However, other times, the user may prefer to listen to a call or audio in an open manner without wearing earbuds.

Furthermore, in some instances, when the removable speaker is inserted into the computing device, the removable speaker can act as either a full-range speaker, which outputs a full range of audio frequencies, or a limited range speaker, such as a tweeter, which outputs an audio frequency range that is narrower than or less than the full range. In this latter case, an onboard speaker of the computing device may output other frequencies to coordinate with the removable speaker. However, when the removable speaker is used as an earbud or headphone, it can output full range audio frequencies.

Figure 1:
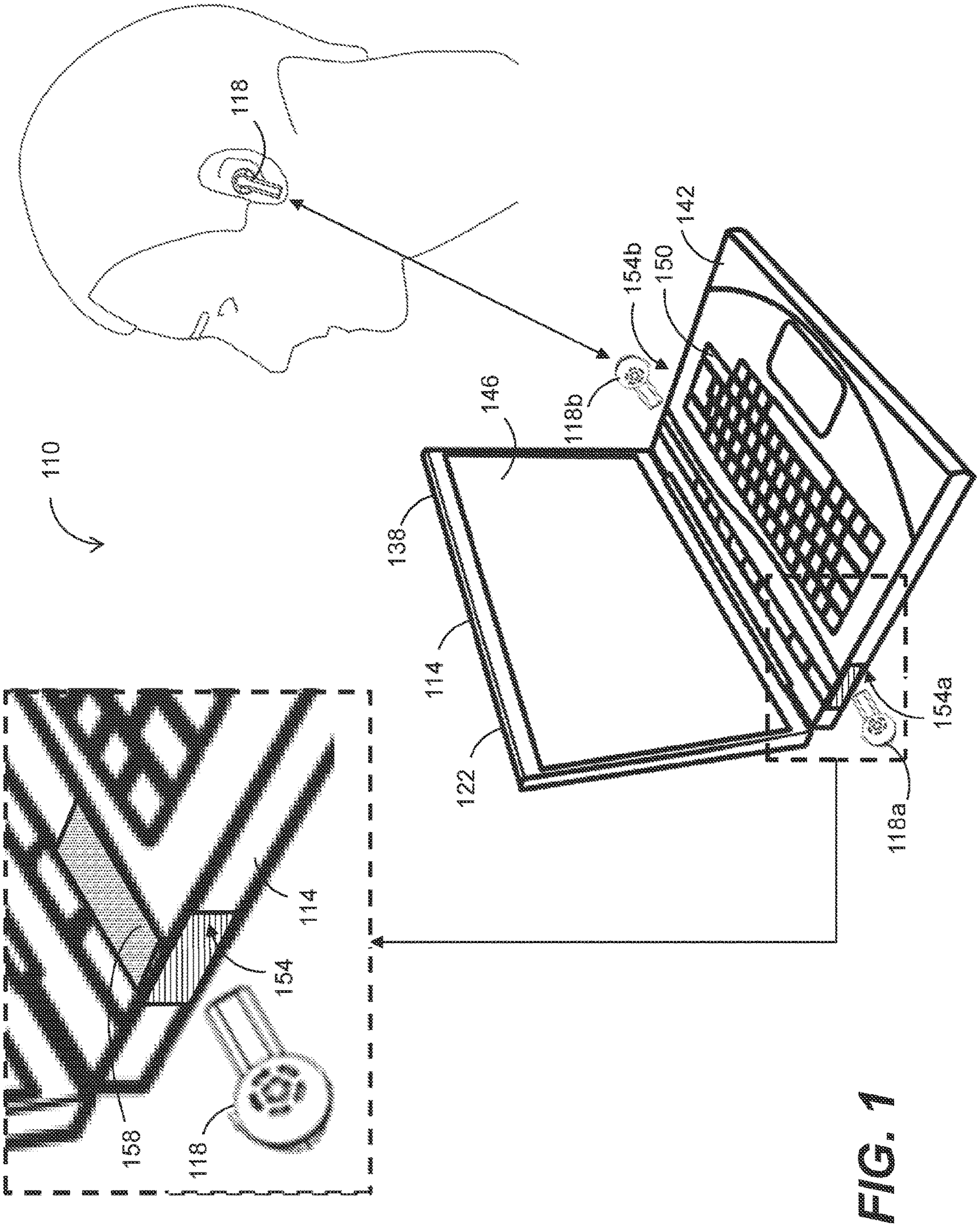
FIG. 1 schematically illustrates a computing device system including a computing device and a speaker according to one embodiment.
Figure 2:
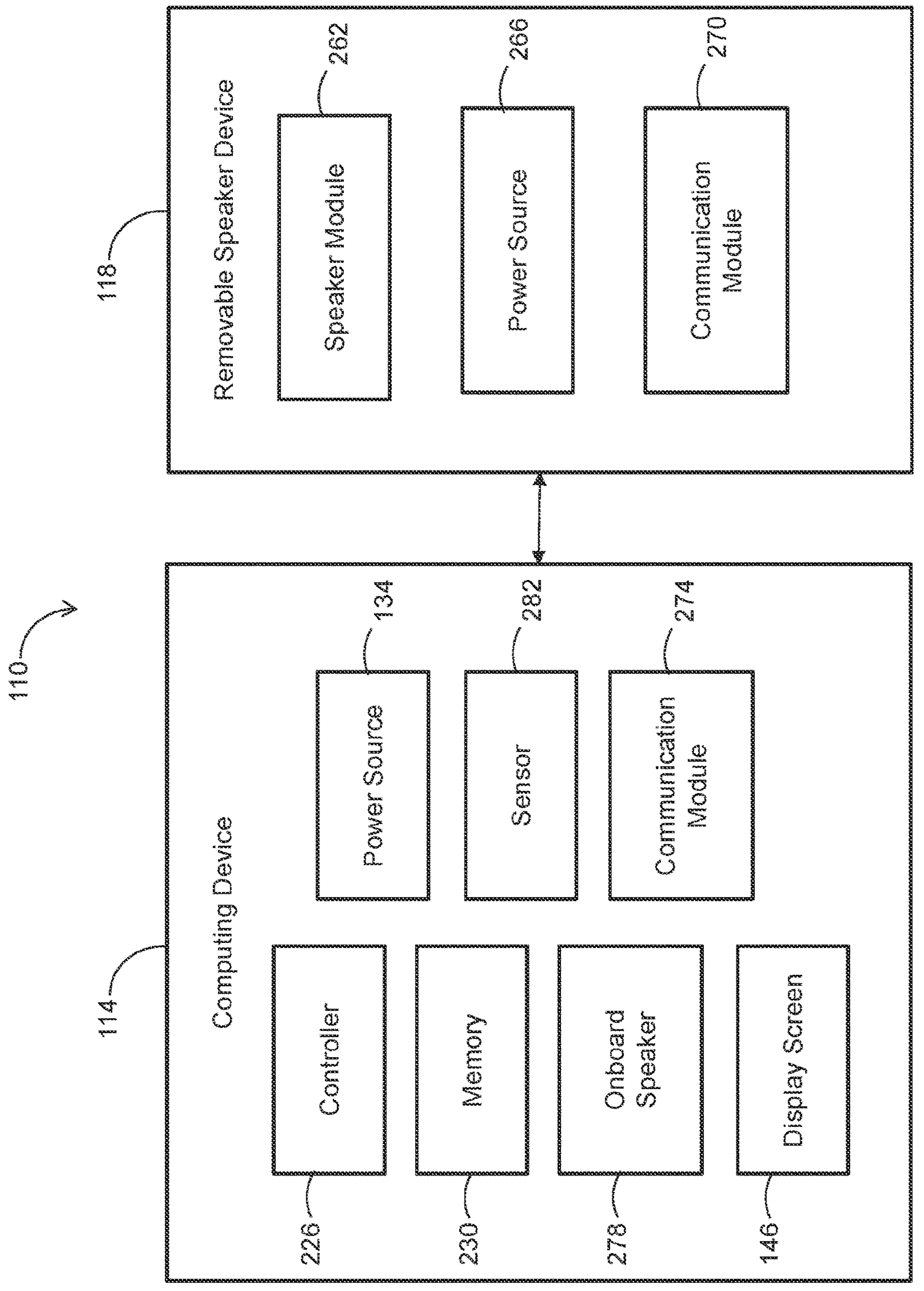
FIG. 2 is a schematic diagram of the computing device system of FIG. 1.
Figure 3:
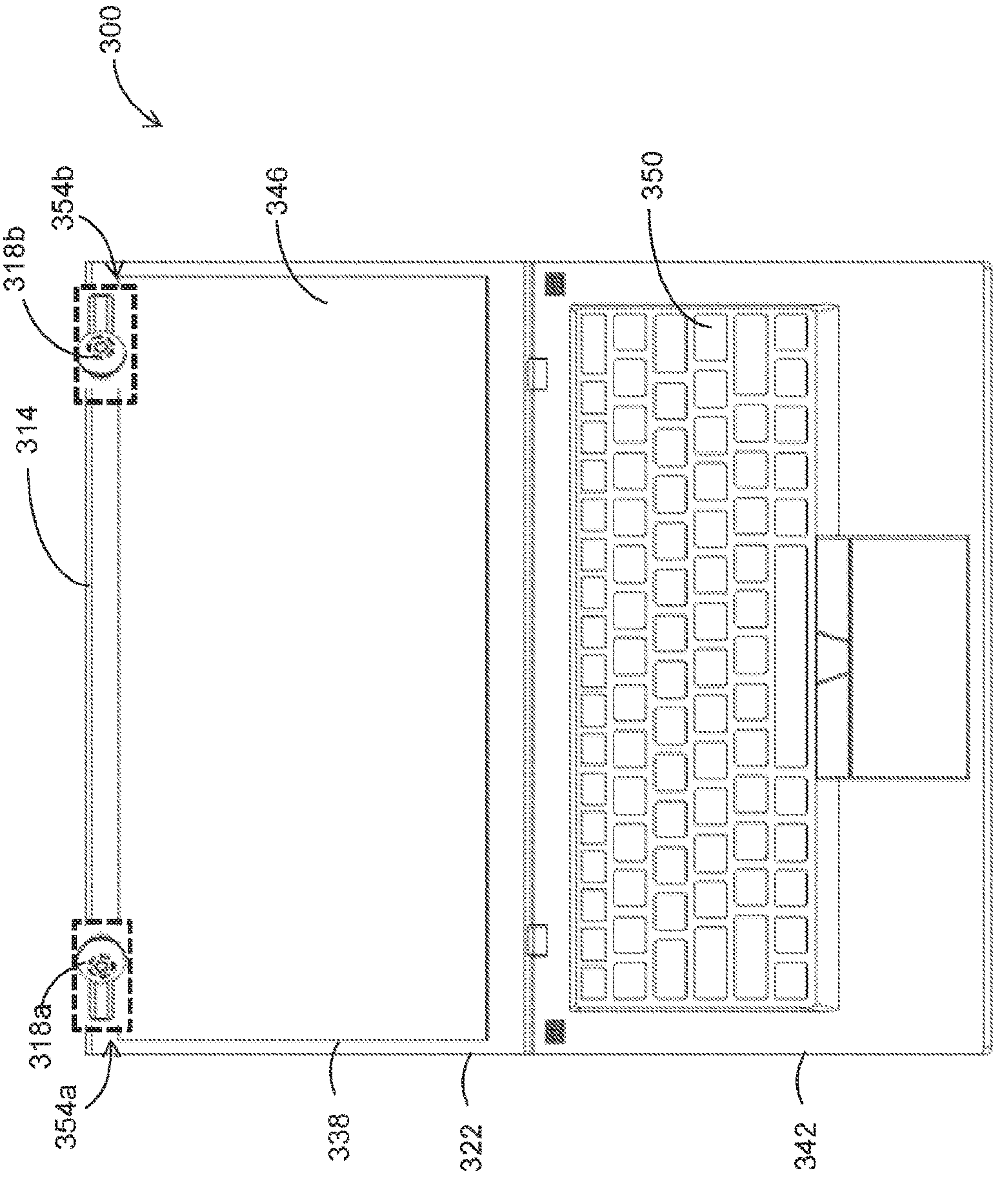
FIG. 3 schematically illustrates a computing device system including a laptop and a speaker according to one embodiment.
Figure 4:
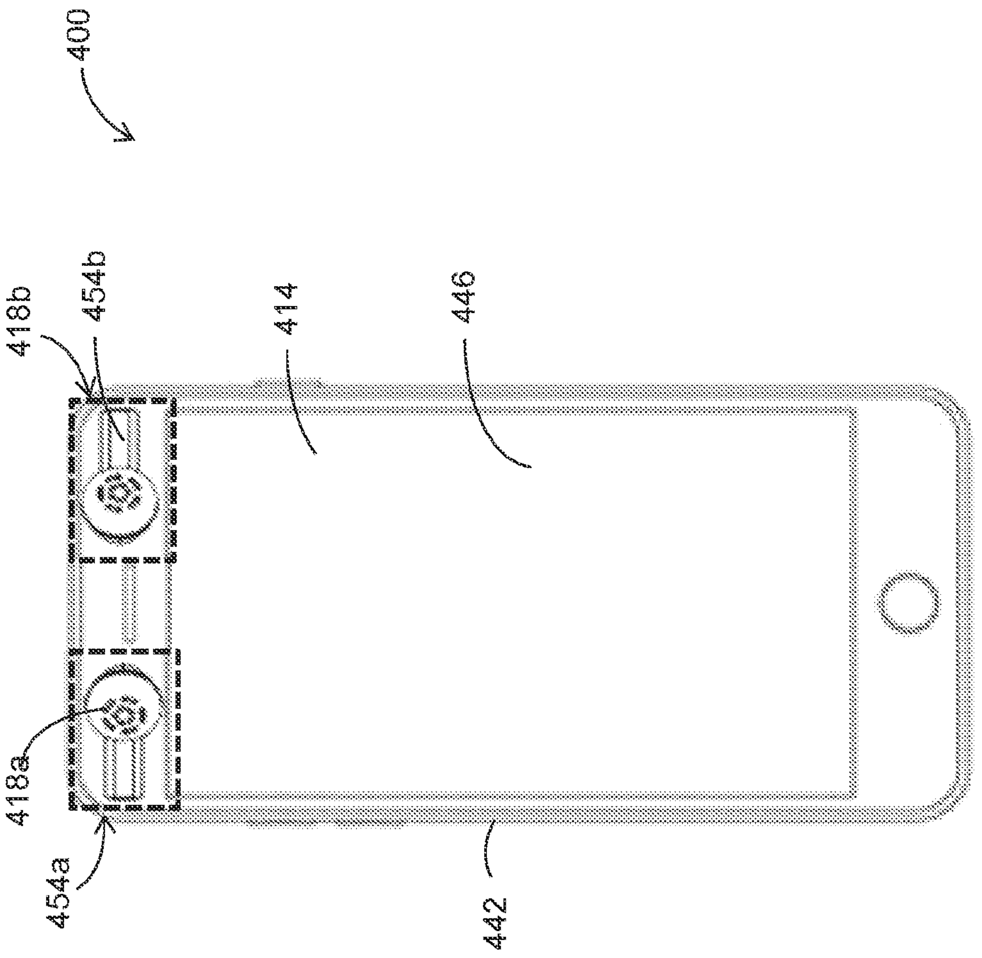
FIG. 4 schematically illustrates a computing device system including a smart phone and a speaker according to one embodiment.
Figure 5:
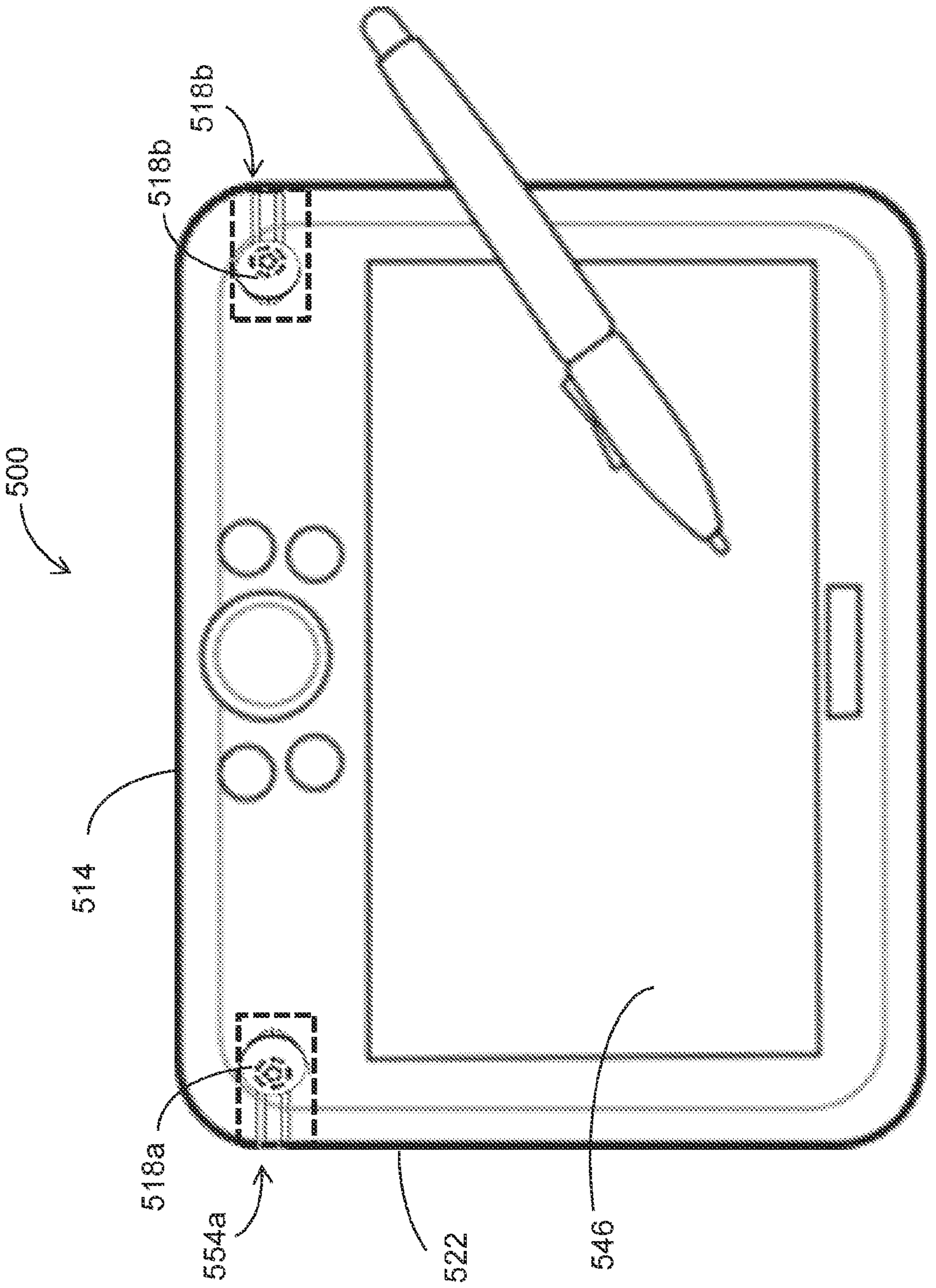
FIG. 5 schematically illustrates a computing device system including a tablet and a speaker according to one embodiment.

FIGS. 1-2 provide an example embodiment of a computing device system 110 including a computing device 114 and a removable speaker 118. The removable speaker 118 is movable between a hidden or a stored position (i.e., when inserted into the computing device 114), and a free or mobile position (i.e., when removed from the computing device 114). In the embodiment illustrated in FIG. 1, the computing device 114 is a laptop. However, in other embodiments the computing device 114 may be other types of mobile devices and smart devices such as a desktop computer, a tablet, a smart phone, or a smart watch, as shown in FIGS. 3-5. The computing device 114 includes a housing 122, which houses the electrical components of the computing device 114, such as a controller 226, a memory 230, and a power source 234. In the illustrated embodiment, the power source 234 is a rechargeable battery, however, other types of power sources 234 may be used. The housing 122 is composed of a first portion 138 supporting a display screen 146 and a second portion 142 supporting a keyboard 150. The display screen 146 provides visual imaging and/or a control panel to a user. However, in other embodiments, one or both the display screen 146 and the keyboard 150 may be rearranged to be on different portions of the housing 122. For example, the display screen 146 and the keyboard 150 may both be on either the first portion 138 or the second portion 142 of the housing 122. Similarly, a keyboard 150 may be visually displayed on the display screen 146 rather than being a separate element.

In embodiments, the first portion 138 and second portion 142 of the housing 122 are pivotable relative to one another. One or both the first portion 138 and the second portion 142 may include a socket 154 for receiving the removable speaker 118. The socket 154 may be positioned in any suitable location of the housing 122 to allow for adequate sound. For example, the socket 154 may be positioned adjacent the display screen 146 or the keyboard 150. Furthermore, the socket 154 may be arranged in a corner of the housing 122, along an edge, or along the bottom or top of the housing 122. In the illustrated embodiment, the second portion 142 of the housing 122 includes a first socket **154*a* for receiving a first removable speaker 118*a* and a second socket 154*b* for receiving a second removable speaker 118*b*. In some instances, the first socket 154*a* and the second socket 154*b* may be sized and shaped to receive either one of the first removable speaker 118*a* or the second removable speaker 118*b*. Furthermore, in some instances, the socket 154 may include holes 158 around the socket 154 to enhance the output of the removable speaker 118 when the removable speaker 118 is received within the socket 154**.

Although the illustrated embodiment includes two removable speakers 118, it should be understood that in some embodiments, only a single removable speaker 118 may be utilized. Therefore, the present description will describe a single removable speaker 118 and socket 154 with characteristics which may be applied to either removable speaker **118*a*, 118*b* or socket 154*a*, 154*b***.

The removable speaker 118 includes a speaker module 262 and a power source 266, such as a rechargeable battery, supported within a body of the removable speaker 118. The removable speaker 118 may be an earbud or a headphone, which may be used as a personal speaker (e.g., a closed speaker) by a user of the computing device 114. The removable speaker 118 is selectively received within the socket 154 so that it is generally hidden when not being used as an earbud. In some embodiments, the entire body of the removable speaker 118 may be inserted into the socket 154 so that it is fully concealed, while in other embodiments, a portion of the removable speaker 118 may extend out of the socket 154 or may be visible when the removable speaker 118 is received within the socket 154.

Once received within the socket 154, the removable speaker 118 may be used as a general speaker (e.g., an open speaker). The removable speaker 118 may also be inserted into the socket 154 to be stored or charged when not in use. Specifically, the power source 234 of the computing device 114 is configured to charge the power source 266 of the removable speaker 118 when the removable speaker 118 is received within the socket 154. In some embodiments, the power source 234 of the computing device 114 is electrically connected to the power source 266 of the removable speaker 118 via a hardwire connection. For example, the socket 154 may include electrical contacts to allow for power transfer between the computing device 114 and the removable speaker 118. In other embodiments, inductive charging may be used to charge the power source 266 of the removable speaker 118. Furthermore, in some embodiments, the removable speaker 118 is powered by the power source 234 of the computing device 114 when the removable speaker 118 is in the stored position while the removable speaker 118 is powered by its own power source 266 when it is removed from the computing device 114.

The removable speaker 118 includes a communication module 270 or a transceiver, which allows the removable speaker 118 to communicate with a communication module 274 of the computing device 114 to receive audio signals. In some instances, the communication module 270 of the removable speaker 118 communicates wirelessly to the communication module 274 of the computing device 114. For example, the removable speaker 118 may utilize various short range wireless communication protocols, such as Bluetooth, near field communication, ZigBee, infrared transmission, etc. In addition to receiving audio signals, the communication module 270 may be used to indicate when the removable speaker 118 is received within the socket 154.

The removable speaker 118 may be in wireless communication with the computing device 114 or may be hardwired to the computing device 114, or a combination thereof. For example, in one embodiment, the removable speaker 118 is in wireless communication with the controller 226 of the computing device 114 when removed from the socket 154 and is hardwired (e.g., via an electrical contact point) when received within the socket 154. The socket 154 may include electrical connectors or electrical contacts to assist in the hardwire communication. In other embodiments, the removable speaker 118 is in wireless communication with the computing device 114 both when received within the socket 154 and when removed from the socket 154.

Additionally, in some embodiments, the computing device 114 may include a sensor 282 configured to sense whether the removable speaker 118 is inserted into the socket 154 of the computing device 114. The sensor 282 may be in communication with the controller 226 to inform the controller 226 when the speaker is received within the socket 154. The controller 226 may operate or communicate differently with the removable speaker 118 depending on whether the removable speaker 118 is received within the socket 154 or whether the removable speaker 118 is removed from the socket 154. For example, in some embodiments, the removable speaker 118 may operate as a full range speaker when removed from the socket 154 and may operate as a limited range speaker when received within the socket 154. To that extent, the controller 226 may provide different audio signals to the removable speaker 118 depending on whether it is received within the socket 154. For example, the removable speaker 118 may include a 2.2/2.1 audio architecture when operating as a limited range speaker or a "tweeter," or may include a 2.0 audio architecture when operating as a full range speaker.

For instance, the removable speaker 118 may receive audio signals from the controller 226 and output a full range audio frequency when being used as an earbud. When operating as a full range audio speaker, the removable speaker 118 may output frequencies of a standard earbud or speaker. For Example, when operating as a full range speaker, the removable speaker may output frequencies between a native low limit and a native high limit. However, once received within the socket 154, the removable speaker 118 may operate as a limited range speaker, such as a tweeter. Therefore, the removable speaker 118 may receive a signal from the controller 226 and output a limited range of audio frequencies, which is a narrower range than the full range, when inserted into the computing device 114. When operating as a limited range audio speaker, the removable speaker 118 may output frequencies primarily above a cut off limit, e.g., 1 kHz, 3.5 kHz, or another value that is higher than the native low limit.

Furthermore, in some instances, the computing device 114 may include an onboard speaker 278, which outputs audio signals that are complimentary to the limited range of audio frequencies output by the removable speaker 118. For example, when the removable speaker 118 is operating as a tweeter, it may output audio frequencies primarily above the cut off limit, e.g., 1 kHz, 3.5 kHz, or another value, while the onboard speaker 278 may output audio frequencies primarily below the cut off limit of the removable speaker.

In the case where multiple removable speakers 118 are included in the computing device system 110, the controller 226 may monitor the state of each removable speaker 118 to determine which removable speakers 118 are inserted into the computing device 114 and which speakers have been removed from the computing device 114. For example, when both removable speakers 118 are removed from the computing device 114, the controller 226 may adjust the audio output of the removable speakers 118 to enable full range output capabilities. When both removable speakers 118 are received within the computing device 114, the controller 226 may adjust the audio output of the removable speakers 118 to enable limited range output capabilities. However, when one removable speaker 118 is removed from the computing device 114 and one removable speaker 118 is received within the computing device 114, the controller 226 may operate both removable speakers 118 in a default mode, such as full range audio.

It should be understood that in some embodiments, the removable speaker may operate as a full range speaker both when removed from the socket and being used as an earbud and when received within the socket and being used as a general speaker. Furthermore, in some embodiments, the user may also manually adjust the output of the speakers to operate within a desired frequency range. This allows a user to override the controller and enable full range output of the removable speaker even when the controller automatically adjusts the output range of the speaker.

It should also be understood that the various features described herein may be combined in different ways to result in other embodiments. For example, some of the features described herein may not all be included in a single embodiment. Rather, some features may be included, and some features may be excluded in various embodiments of the present disclosure.

FIGS. 3-5 provide additionally example embodiments of computing device systems. It should be understood that the various features and embodiments described herein may be included and/or combined into the embodiments illustrated in FIGS. 3-5. FIG. 3 illustrates a computing device system 300 including a removable speaker 318 and a computing device 314 in the form of a laptop. Similar to the computing device 114 illustrated in FIG. 1, the computing device 314 includes a housing 322, which houses the electrical components of the computing device, such as any one or more of the following: a controller, a memory, a power source, a sensor, an onboard speaker, and a communication module. The housing 322 is composed of a first portion 338 supporting a display screen 346 and a second portion 342 supporting a keyboard 350. The first portion 338 and second portion 342 of the housing 322 are pivotable relative to one another. The first portion 338 includes a first socket 354*a* for receiving a first removable speaker 318*a* and a second socket 354*b* for receiving a second removable speaker 318*b*. In this configuration the removable speakers 318 are positioned adjacent the display 346, which may, in some instances, coordinate the audio and the video well.

FIG. 4 illustrates a computing device system 400 including a removable speaker 418 and a computing device 414 in the form of a smart phone. The computing device 314 includes a housing 422, which houses the electrical components of the computing device, including any one or more of the following: a controller, a memory, a power source, a sensor, an onboard speaker, and a communication module. The housing 422 includes a display screen 446, which may at times provide a keyboard. The housing 422 includes a first socket 454*a* for receiving a first removable speaker 418*a* and a second socket 454*b* for receiving a second removable speaker.

FIG. 5 illustrates a computing device system 500 including a removable speaker 518 and a computing device 514 in the form of a smart tablet. The computing device 514 includes a housing 522, which houses the electrical components of the computing device, such as any one or more of the following: a controller, a memory, a power source, a sensor, an onboard speaker, and a communication module. The housing 522 includes a display screen 546, which may at times provide a keyboard. The housing 522 includes a first socket 554*a* for receiving a first removable speaker 518*a* and a second socket 554*b* for receiving a second removable speaker 518*b*.

It should be noted that a plurality of hardware and software-based devices, as well as a plurality of different structural components may be utilized to implement the embodiments described herein or portions thereof. In addition, it should be understood that embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects described herein may be implemented in software (stored on non-transitory computer-readable medium) executable by one or more processors. As such, it should be noted that a plurality of hardware and software-based devices, as well as a plurality of different structural components may be used to implement the embodiments described herein.

For example, "controller," "control unit," and "control assembly" described in the specification may include one or more processors, one or more memory modules including non-transitory computer-readable medium, one or more input/output interfaces, and various connections (for example, a system bus) connecting the components. Furthermore, some embodiments described herein may include one or more electronic control units or controllers. It will be appreciated that these electronic control units or controllers may be comprised of one or more generic or specialized electronic processors, such as, for example, microprocessors, digital signal processors, customized processors, and field programmable gate arrays (FPGAs) and unique stored program instructions (including both software and firmware) that control the one or more electronic control units or controllers to implement the functionality described herein.

Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a ROM (Read Only Memory), a RAM (Random Access Memory), register memory, a processor cache, or any combination thereof.

Systems, methods, and devices in accordance with the present disclosure may take any one or more of the following example configurations.

(1) A computing device system including a computing device including a housing, electronic components disposed within the housing, the electronic components including a controller, a memory, and a power source, a display screen supported on the housing, and a socket extending into the housing; and a removable speaker selectively received within the socket, wherein the removable speaker includes a power source that is automatically charged when received within the socket.

(2) The computing device system of (1), wherein the housing includes a first portion supporting the display screen and a second portion supporting a keyboard.

(3) The computing device system of (2), wherein the socket is positioned in the second portion of the housing.

(4) The computing device system of (1), wherein the computing device is at least one selected from the group consisting of a laptop, a smart phone, and a tablet.

(5) The computing device system of (1), wherein the removable speaker is configured to operate as a limited range speaker when received within the socket and is configured to operate as a full range speaker when removed from the socket.

(6) The computing device system of (5), wherein the removable speaker outputs high frequency audio signals primarily above a cut off limit when operating as a limited range speaker, and wherein the removable speaker outputs audio signals in a native frequency range when operating as a full range speaker.

(7) The computing device system of (1), wherein the computing device includes a sensor configured to sense when the removable speaker is received within the socket.

(8) The computing device system of (7), wherein the controller is in communication with the sensor, and wherein the controller is configured to adjust an audio output of the speaker when the speaker is received within the socket.

(9) The computing device system of (1), further comprising a second removable speaker configured to be selectively received within a second socket in the housing.

(10) The computing device system of (1), wherein the removable speaker is an earbud or a headphone.

(11) The computing device system of (1), wherein the removable speaker is in wireless communication with the computing device when removed from the socket, and wherein the removable speaker has a hardwire connection when received within the socket.

(12) The computing device system of (1), wherein the removable speaker is in wireless communication with the computing device when removed from the socket and when the removable speaker is received within the socket.

(13) The computing device system of (1), wherein the power source of the removable speaker is inductively charged when received within the socket.

(14) A computing device system including a computing device including a housing, electronic components disposed within the housing, the electronic components including a controller, a memory, and a power source, a display screen supported on the housing, and a socket extending into the housing; and a removable speaker selectively received within the socket, wherein the removable speaker is configured to operate as a tweeter when received within the socket and is configured to operate as a full range speaker when removed from the socket.

(15) The computing device system of (14), wherein, when operating as a tweeter, the removable speaker outputs high frequency audio signals primarily above a cut off limit.

(16) The computing device system of (14), wherein, when operating as a full range speaker, the removable speaker outputs audio signals primarily between a native low limit and a native high limit.

(17) The computing device system of (14), further comprising an onboard speaker housed within the housing, wherein, when the removable speaker is received within the socket, the onboard speaker is configured to output audio signals primarily below a cut off limit and the removable speaker is configured to output audio signals primarily above the cut off limit.

(18) The computing device system of (14), wherein the computing device includes a sensor configured to sense when the removable speaker is received within the socket, and wherein the controller is in communication with the sensor, and wherein the controller is configured to adjust an audio output of the speaker when the speaker is received within the socket.

(19) The computing device system of (14), wherein the removable speaker includes a power source that is automatically charged when received within the socket.

(20) A computing device system including a housing including a display screen, a first socket, and a second socket; electronic components disposed within the housing, the electronic components including a controller, a memory, and a power source; a first removable speaker selectively received within the first socket; and a second removable speaker selectively received within the second socket, wherein the first speaker and the second speaker are operable as wireless earbuds when removed from the respective first socket and second socket.

Various features and advantages of the embodiments described herein are set forth in the following claims.

What is claimed is:

1. A computing device system comprising:

a computing device including a housing, electronic components disposed within the housing, the electronic components including a controller, a memory, and a power source, a display screen supported on the housing, and a socket extending into the housing; and a removable speaker selectively received within the socket, wherein the controller is configured to operate the removable speaker as a tweeter when the removable speaker is received within the socket, and wherein the controller is configured to operate the removable speaker as a full range speaker when the removable speaker is removed from the socket.

2. The computing device system of claim 1, wherein, when operating as a tweeter, the removable speaker outputs high frequency audio signals primarily above a cut off limit.

3. The computing device system of claim 1, wherein, when operating as a full range speaker, the removable speaker outputs audio signals between a native low limit and a native high limit.

4. The computing device system of claim 1, further comprising an onboard speaker housed within the housing, wherein, when the removable speaker is received within the socket, the onboard speaker is configured to output audio signals primarily below a cut off limit and the removable speaker is configured to output audio signals primarily above the cut off limit.

5. The computing device system of claim 1, wherein the computing device includes a sensor configured to sense when the removable speaker is received within the socket, wherein the controller is in communication with the sensor, and wherein the controller is configured to determine whether the removable speaker is received within the socket, responsive to determining the removable speaker is received within the socket, operate the removable speaker as the tweeter, responsive to determining the removable speaker is not received within the socket, operate the removable speaker as the full range speaker, and adjust an audio output of the removable speaker when the removable speaker is received within the socket.

6. A computing device system comprising:

a computing device including a housing, electronic components disposed within the housing, the electronic components including a controller, a memory, and a power source, a display screen supported on the housing, and a socket extending into the housing; and a removable speaker selectively received within the socket, wherein the removable speaker includes a power source, wherein the power source is automatically charged when received within the socket, wherein the removable speaker is configured to operate as a limited range speaker when received within the socket and is configured to operate as a full range speaker when removed from the socket.

7. The computing device system of claim 6, wherein the housing includes a first portion supporting the display screen and a second portion supporting a keyboard.

8. The computing device system of claim 7, wherein the socket is positioned in the second portion of the housing.

9. The computing device system of claim 6, wherein the computing device is at least one selected from a group consisting of a laptop, a smart phone, and a tablet.

10. The computing device system of claim 6, wherein the removable speaker outputs high frequency audio signals primarily above a cut off limit when operating as a limited range speaker, and wherein the removable speaker outputs audio signals primarily between a native low limit and a native high limit when operating as a full range speaker, wherein the cut of limit is between the native low limit and the native high limit.

11. The computing device system of claim 6, wherein the computing device includes a sensor configured to sense when the removable speaker is received within the socket.

12. The computing device system of claim 11, wherein the controller is in communication with the sensor, and wherein the controller is configured to determine whether the removable speaker is received within the socket, responsive to determining the removable speaker is received within the socket, operate the removable speaker as a limited range speaker, responsive to determining the removable speaker is not received within the socket, operate the removable speaker as a full range speaker, and adjust an audio output of the removable speaker when the removable speaker is received within the socket.

13. The computing device system of claim 6, further comprising a second removable speaker configured to be selectively received within a second socket in the housing.

14. The computing device system of claim 6, wherein the removable speaker is an earbud or a headphone.

15. The computing device system of claim 6, wherein the removable speaker is in wireless communication with the computing device when removed from the socket, and wherein the removable speaker has a hardwire connection when received within the socket.

16. The computing device system of claim 6, wherein the removable speaker is in wireless communication with the computing device when removed from the socket and when the removable speaker is received within the socket.

17. The computing device system of claim 6, wherein the power source of the removable speaker is inductively charged when received within the socket.

18. A computing device comprising:

a housing including a display screen, a first socket, and a second socket;

electronic components disposed within the housing, the electronic components including a controller, a memory, and a power source;

a first removable speaker selectively received within the first socket; and a second removable speaker selectively received within the second socket, wherein the first removable speaker and the second removable speaker are operable as wireless earbuds when removed from the respective first socket and second socket, wherein the controller is configured to operate first removable speaker and the second removable speaker as limited range speakers when received within the first socket and the second socket, respectively, and wherein the controller is configured to operate the first removable speaker and the second removable speaker are as full range speakers when removed from the first socket and the second socket.

19. The computing device of claim 18, wherein the computing device includes a sensor configured to sense when the first removable speaker is received within the first socket, wherein the controller is in communication with the sensor, and wherein the controller is configured to determine whether the first removable speaker is received within the first socket, responsive to determining the first removable speaker is received within the first socket, operate the first removable speaker as one of the limited range speakers, responsive to determining the first removable speaker is not received within the first socket, operate the first removable speaker as one of the full range speakers, and adjust an audio output of the first removable speaker when the first removable speaker is received within the first socket.

20. The computing device of claim 19, wherein the computing device includes a second sensor configured to sense when the second removable speaker is received within the second socket, wherein the controller is in communication with the second sensor, and wherein the controller is configured to determine whether the second removable speaker is received within the second socket, responsive to determining the second removable speaker is received within the second socket, operate the second removable speaker as a second one of the limited range speakers, responsive to determining the second removable speaker is not received within the second socket, operate the second removable speaker as a second one of the full range speakers, and adjust an audio output of the second removable speaker when the second removable speaker is received within the second socket.

* * * * *